(No Model.)　　　　　　　　　　　　　　　　　　2 Sheets—Sheet 1.
C. S. SEATON.
MACHINE FOR FINISHING BOLT HEADS.
No. 503,879.　　　　　　　　　　Patented Aug. 22, 1893.
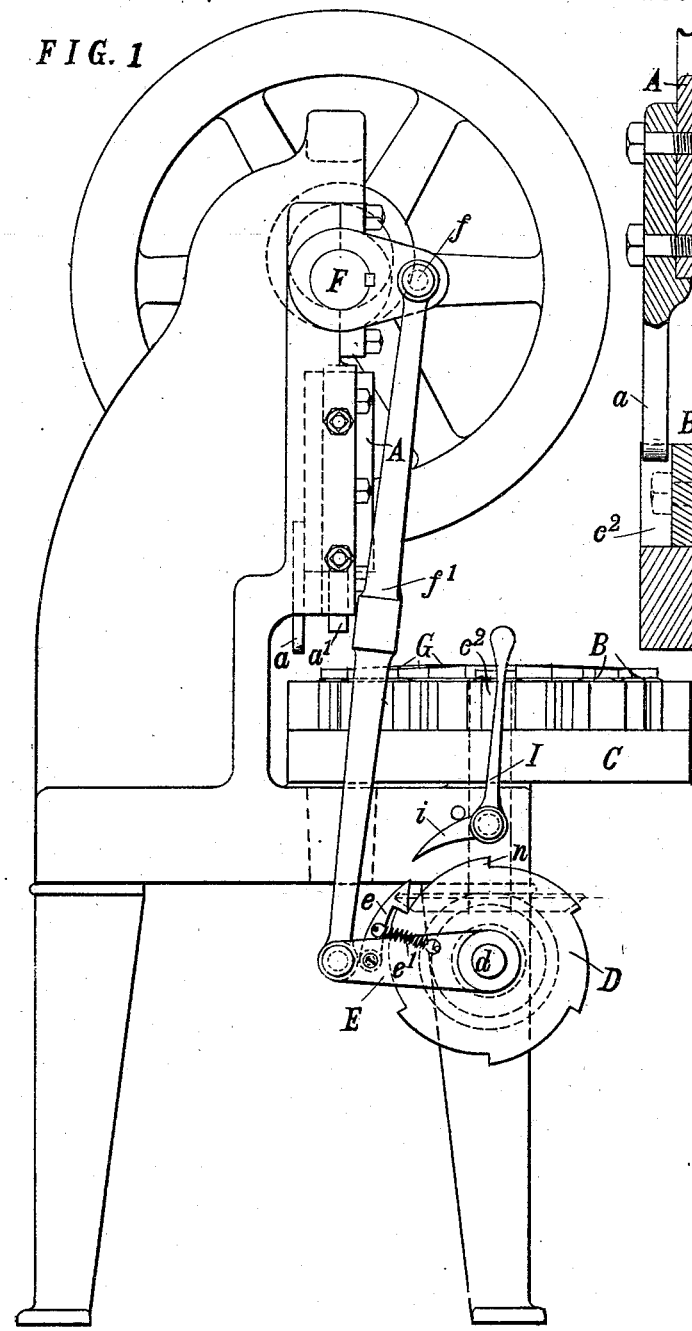
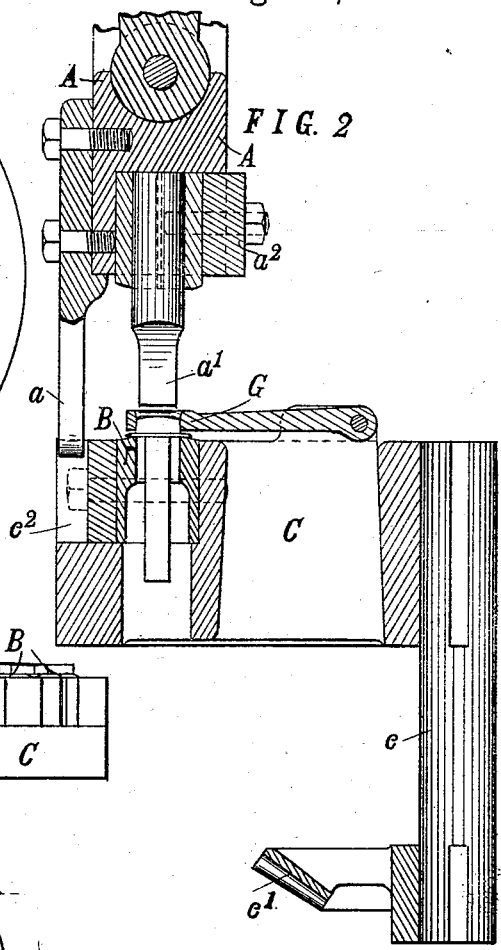
WITNESSES.
Frank Miller.
M. S. Ingham.
INVENTOR.
Charles S. Seaton
By E. L. Thurston
his attorney (No Model.) 2 Sheets—Sheet 2.

C. S. SEATON.
MACHINE FOR FINISHING BOLT HEADS.

No. 503,879. Patented Aug. 22, 1893.

WITNESSES.
Frank Miller.
M. S. Ingham.

INVENTOR.
Charles S. Seaton
By E. L. Thurston
his attorney

UNITED STATES PATENT OFFICE.

CHARLES S. SEATON, OF CLEVELAND, OHIO.

MACHINE FOR FINISHING BOLT-HEADS.

SPECIFICATION forming part of Letters Patent No. 503,879, dated August 22, 1893.

Application filed August 19, 1892. Serial No. 443,489. (No model.)

*To all whom it may concern:*

Be it known that I, CHARLES S. SEATON, a citizen of the United States, residing at Cleveland, in the county of Cuyahoga and State of Ohio, have invented certain new and useful Improvements in Machines for Finishing Bolt-Heads; and I do hereby declare the following to be a full, clear, and exact description of the invention, such as will enable others skilled in the art to which it appertains to make and use the same.

The commonest and cheapest method of heading bolts is to upset the end of the bolt rod in a socket of the shape of the desired head; but when bolts are headed by this method a thin projecting fin of metal is generally formed on the lower edge of the head. This fin is of very little consequence on a rivet or track bolt or certain other kinds of bolts having button shaped heads; but such a fin on a square headed bolt or any bolt of the class generally known as machine bolts, renders the bolt unsalable and comparatively useless. It has therefore been the practice heretofore to head machine bolts by a more expensive method than that first referred to, in order to avoid the formation of the "fin."

My invention relates to a machine adapted to rapidly and accurately finish the heads of machine bolts which have been formed with a fin thereon, whereby it is possible to first head machine bolts by the cheapest method, and afterward remove the fin and finish the head on my machine,—the result being to lessen the cost of heading machine bolts and to produce bolts which, in the opinion of many, are better than those now commonly made from similar stock.

My invention consists in the combination of a shearing die, a device for holding the head of the bolt accurately in the proper relation to the shearing die, and a plunger adapted to force said bolt, shank first, through the shearing die.

It also consists in the construction and combination of parts hereinafter described,—all of which are pointed out definitely in the claims.

Figure 3:
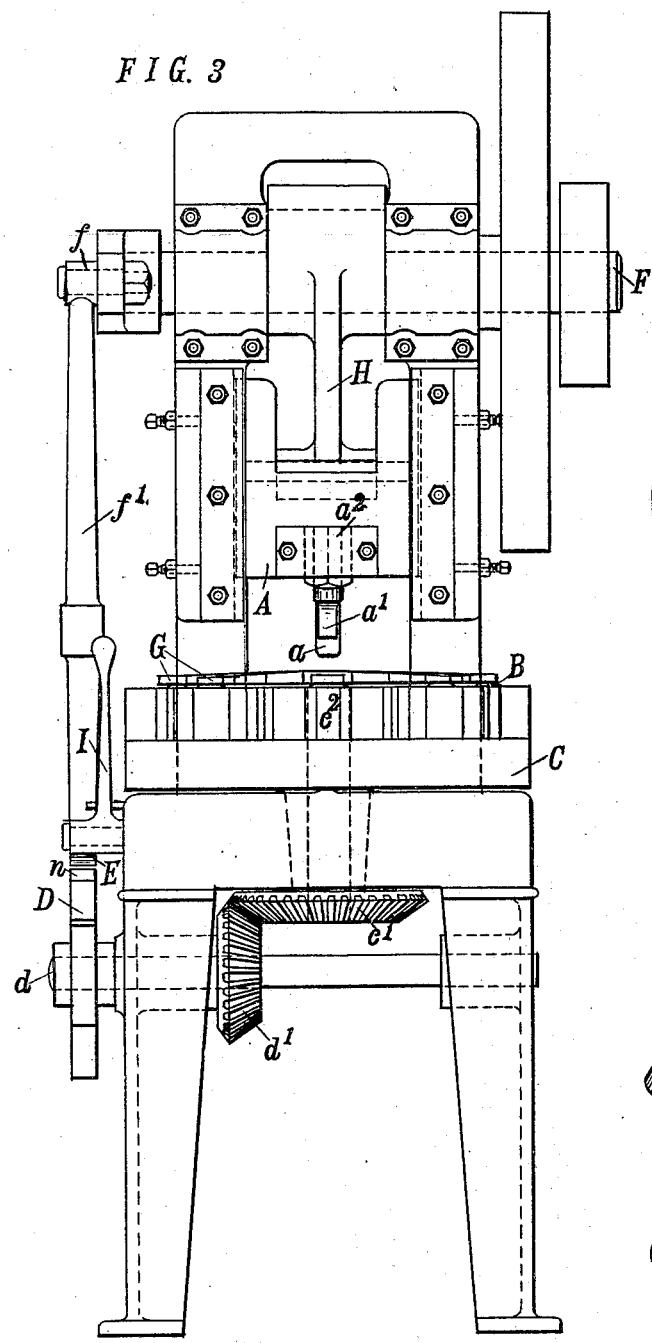
Figure 4:
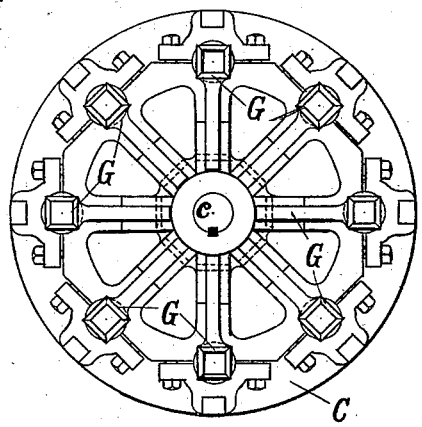
Figure 5:
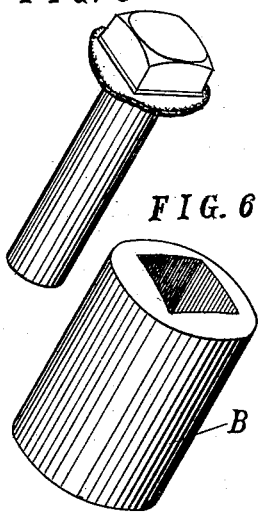
Figure 6:
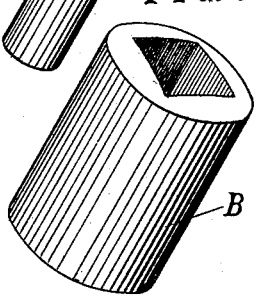

In the drawings, Figure 1 is a side elevation of a machine embodying my invention. Fig. 2 is a sectional side elevation of the cross-head, plunger, table, shearing die, centering device, &c. Fig. 3 is an end elevation of said machine. Fig. 4 is a top view of the table and parts carried thereby. Fig. 5 is a perspective view of a bolt of the character the machine is designed to finish; and Fig. 6 is a perspective view of the shearing die.

Referring now to the parts by letter, A represents a reciprocating cross-head which is mounted in suitable vertical guides on the frame of the machine. The cross-head is operated by a crank shaft F which is connected to the cross-head by a connecting rod H.

$a'$ represents a plunger or punch which is removably secured in a socket in the lower end of the cross-head by a clamp $a^2$ or other suitable means.

B represents a shearing die having its shearing edges so arranged with relation to each other as to form the outline of the bolt to be trimmed.

Fig. 6 shows one of the shearing dies as I prefer to form them, adapted to shear a square bolt,—that is to say the upper edges of a square hole through the die form the shearing edges. The upper end of the die is slightly crowned, whereby the shearing edges are curved to facilitate the shearing operation. To trim the bolt head properly, the die is held exactly beneath the plunger, the bolt is passed shank first through the hole, and the head is held by a suitable centering device in the proper relation to the shearing edges,—that is to say with the sides of the head parallel with the sides of the hole through which it will be forced as the plunger descends.

In the machine shown in the drawings, a circular table C is secured to a vertical shaft $c$ which is mounted on the frame of the machine. In this table near its edge, I secure an annular row of the shearing dies B, so placed that as the table is revolved they pass one by one beneath the plunger. On the shaft $c$ a bevel gear $c'$ is fixed, which meshes with a bevel gear $d'$ fixed on a horizontal shaft $d$ which is also mounted in the frame. On the shaft $d$ a ratchet wheel D is secured. Pivoted on the shaft $d$ is a rocker arm E to which is pivoted a pawl $e$ adapted to engage with the ratchet wheel D, and held in engagement therewith by a spring $e'$. The rocker-arm E is rocked by means of a crank arm $f$ on the driving shaft F and a pitman $f'$ by which the two arms are connected. At each revolution of the shaft F, the rocker-arm E is moved backward and then forward and the ratchet wheel is moved through a part of one revolution which is determined by the number of divisions thereon and the throw of the rocker-arm. As shown the ratchet wheel and its shaft $d$ moves through one sixth of its revolution during each complete revolution of the crank shaft. At each movement of the shaft $d$ the table C is moved on its axis and a new shearing die brought beneath the plunger. In order that the opening in the shearing dies shall be held directly beneath the plunger as it descends, vertical grooves $c^2$ are made in the edge of the table, and a bar $a$, secured to the cross-head having a tapering end to insure its engagement with the grooves, enters one of said grooves as the plunger descends and thereby locks the table with the opening in one of the dies directly beneath the punch.

The centering devices which are shown in the drawings consist of arms G pivoted to the top of the table near its center,—which arms are provided with the proper shaped hole (square in the case illustrated) to fit over the bolt head and hold it as the plunger descends.

The bolts are put into the machine by hand, the centering arms being raised while the bolt is placed shank down through the hole in the shearing die. The centering arm is then caused to surround the head of the bolt, thereby holding it securely in the proper position. The operation of the machine is otherwise automatic in its action. The table is moved forward step by step and at each pause in the motion of the table the plunger descends and forces the bolt, shank first, through the shearing die, thereby removing the fin and finishing the head.

It might be suggested that if the heads of the bolts were placed in the hole in the shearing die, with the shank up, a separate centering device could be dispensed with. Perhaps the method of procedure would work experimentally, but practically it would not be as successful as that shown, for several reasons,—viz., principally because if the bolt were driven through the shearing die head first, the shearing edges would be quickly worn down by their engagement with the "scale" on the head. By forcing them through the die, shank first, the shearing edges engage first with the thickest part of the head, and therefore do not tend to slide on the "scale." Another reason is that the bolts could not be forced forward with certainty in a straight line if the pressure of the plunger were applied to the end of the shank, because in heading bolts it sometimes happens that the head is not formed centrally on the shank; but by my machine above described the heads are finished independently of the shanks.

I represents a lever pivoted to the frame and having a claw $i$ which may be thrown down in the path of the pawl when it is moving backward to engage with a fresh tooth $n$ in the ratchet wheel. The pawl by such engagement is lifted from the ratchet wheel and the table is not therefore moved until the pawl is again allowed to engage with the ratchet wheel.

Having described my invention I claim—

1. In a machine for finishing bolt heads, in combination, a vertically reciprocating plunger and mechanism for actuating the same, a horizontal revolving table, an annular row of shearing dies carried thereby, means for imparting to said table a step by step feed movement, locking mechanism for holding said table in proper relation to the plunger, and a centering device adapted to engage with the head of the bolt, whereby the bolt may be driven, shank foremost, past the shearing edges of the dies, substantially as and for the purpose set forth.

2. In a machine for finishing bolt heads, a vertically reciprocating plunger, mechanism for actuating the same, and a locking bar connected with said plunger, combined with a horizontal revolving table having a series of vertical grooves with which said locking bar engages, an annular series of shearing dies secured to said table, and a series of centering devices secured to said table and adapted to engage with the bolt heads to be finished, and means for imparting to said table a step by step feed movement, substantially as set forth.

3. In a machine for finishing bolt heads, a vertically reciprocating cross-head A, plunger $a'$, a crank shaft F, a horizontal table C, a shaft $c$ to which the table is secured, a shaft $d$ and the bevel gears $c'$ $d'$, combined with the ratchet wheel D secured to the shaft $d$, the rocker-arm E, pawl $e$, pitman $f$, an annular series of shearing dies secured to the table, a locking device for said table, and a centering device adapted to engage with the head of the bolt to be finished, substantially as and for the purpose specified.

4. In a machine for finishing bolt heads, in combination, a vertically reciprocating plunger, mechanism for actuating the same, a horizontal revolving table, a series of shearing dies secured thereto, mechanism for imparting to said table a step by step feed movement, a table locking device, and a series of arms G pivoted to the table having holes in their outer ends adapted to engage with the heads of the bolts to be finished, substantially as and for the purpose specified.

In testimony whereof I affix my signature in presence of two witnesses.

CHAS. S. SEATON.

Witnesses:
 M. S. INGHAM,
 E. L. THURSTON.